United States Patent
Park et al.

(10) Patent No.: US 9,304,351 B2
(45) Date of Patent: Apr. 5, 2016

(54) DISPLAY DEVICE AND MANUFACTURING METHOD THEREOF

(71) Applicant: Samsung Display Co., Ltd., Yongin, Gyeonggi-do (KR)

(72) Inventors: Ha-Young Park, Yongin (KR); Si Kwang Kim, Yongin (KR); Se Hee Han, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 14 days.

(21) Appl. No.: 14/483,435

(22) Filed: Sep. 11, 2014

(65) Prior Publication Data
US 2015/0293385 A1 Oct. 15, 2015

(30) Foreign Application Priority Data
Apr. 14, 2014 (KR) .................. 10-2014-0044402

(51) Int. Cl.
*G02F 1/1337* (2006.01)
*G02F 1/1334* (2006.01)
*G02F 1/1341* (2006.01)

(52) U.S. Cl.
CPC ............ *G02F 1/1334* (2013.01); *G02F 1/1337* (2013.01); *G02F 1/1341* (2013.01)

(58) Field of Classification Search
CPC .................................................. G02F 1/1341
See application file for complete search history.

(56) References Cited

U.S. PATENT DOCUMENTS

| 5,946,070 A | 8/1999 | Kohama et al. |
|---|---|---|
| 7,123,319 B2 | 10/2006 | Broer et al. |
| 2013/0293799 A1* | 11/2013 | Lee ................... G02F 1/13394 349/42 |
| 2014/0368770 A1 | 12/2014 | Chae et al. |
| 2015/0049286 A1 | 2/2015 | Kim et al. |

FOREIGN PATENT DOCUMENTS

| JP | 08-201821 | 8/1996 |
|---|---|---|
| JP | 09-005761 | 1/1997 |
| JP | 2006-201547 | 8/2006 |
| JP | 2008-242150 | 10/2008 |
| KR | 10-2004-0011671 | 2/2004 |
| KR | 10-0688958 | 2/2007 |
| KR | 10-2014-0145723 | 12/2014 |
| KR | 10-2015-0020909 | 2/2015 |

* cited by examiner

*Primary Examiner* — Phu Vu
(74) *Attorney, Agent, or Firm* — Knobbe Martens Olson & Bear LLP

(57) ABSTRACT

A display device includes: a substrate which includes a plurality of pixel areas disposed in a matrix configuration; a pixel electrode positioned in each of the pixel areas; a roof layer positioned on the pixel electrode and spaced apart from the pixel electrode with a microcavity therebetween; injection holes respectively positioned at two edges of the microcavity; a support positioned at one edge of the microcavity and adjacent to one of the injection holes; an alignment layer positioned on an inner surface of the microcavity; and a liquid crystal layer positioned in the microcavity. The support is disposed at each of opposite edges of two microcavities which are adjacent to each other in a column direction.

20 Claims, 15 Drawing Sheets

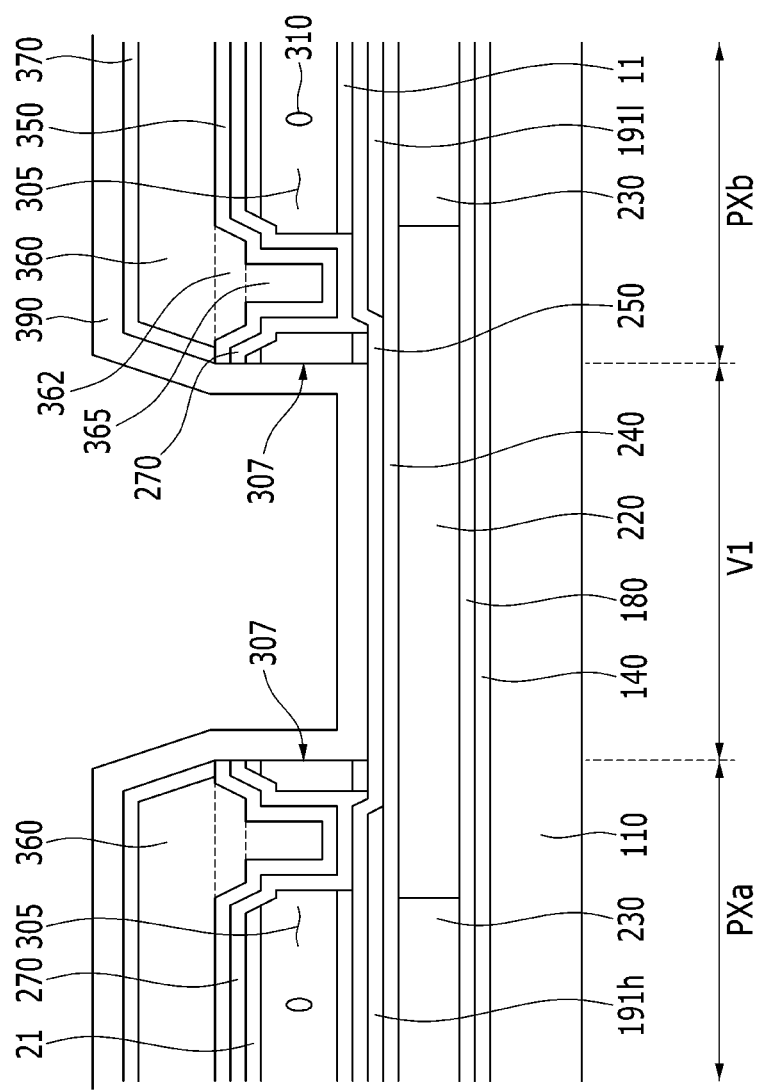

DISPLAY DEVICE AND MANUFACTURING METHOD THEREOF

CROSS-REFERENCE TO RELATED APPLICATION

This application claims priority to, and the benefit of, Korean Patent Application No. 10-2014-0044402 filed in the Korean Intellectual Property Office on Apr. 14, 2014, the entire contents of which are incorporated herein by reference.

BACKGROUND

1. Field

The present disclosure relates to a display device and a manufacturing method thereof.

2. Description of the Related Technology

A liquid crystal display (LCD) is a common type of flat panel display currently in use. The liquid crystal display generates an electric field by applying different potentials to a pixel electrode and a common electrode of a liquid crystal display panel in which a liquid crystal layer is formed between a lower panel and an upper panel to change arrangement of liquid crystal molecules of the liquid crystal layer, and as a result, displays an image by controlling polarization of incident light.

The lower may include thin film transistors and the upper panel may face the lower panel. In the lower panel, a gate line transferring a gate signal, a data line transferring a data signal, a thin film transistor connected to the gate line and the data line, a pixel electrode connected with the thin film transistor, and the like are generally formed. In the upper panel, a light block, a color filter, a common electrode, and the like may be formed, and at least one thereof may be formed in the lower panel.

In a general liquid crystal display, two substrates for the lower panel and the upper panel are used, and a process of forming and bonding the aforementioned constituent elements onto each substrate is required. As a result, the liquid crystal display panel is heavy and thick, and there is a problem in costs, a processing time, and the like. Recently, a technique for manufacturing a display device by forming a tunnel-shaped structure on one substrate and injecting a liquid crystal into the structure has been developed.

The above information disclosed in this Background section is only for enhancement of understanding of the background and therefore it may contain information that does not form the prior art that is already known in this country to a person of ordinary skill in the art.

SUMMARY OF CERTAIN INVENTIVE ASPECTS

The present disclosure has been made in an effort to provide a display device and a manufacturing method thereof having advantages of controlling an agglomerated position of an alignment material in a display device manufactured by using one substrate.

Further, the present disclosure has been made in an effort to provide a display device and a manufacturing method thereof having advantages of reducing an injection time of a liquid crystal and preventing bubbles from being generated in a liquid crystal layer after injecting the liquid crystal.

One embodiment provides a display device comprising: a substrate including a plurality of pixel areas disposed in a matrix configuration; a pixel electrode positioned in each of the pixel areas; a roof layer positioned on the pixel electrode and spaced apart from the pixel electrode with a microcavity therebetween; injection holes respectively positioned at two edges of the microcavity; a support positioned at one edge of the microcavity and adjacent to one of the injection holes; an alignment layer positioned on an inner surface of the microcavity; and a liquid crystal layer positioned in the microcavity. The support is disposed at each of opposite edges of two microcavities which are adjacent to each other in a column direction.

The alignment layer may be agglomerated around the support, and the injection hole adjacent to the support may not be fully blocked.

A plurality of the microcavities may be disposed in a matrix configuration, and a first valley may be formed between microcavities positioned in different rows.

The support may be positioned to be adjacent to both sides of the first valley.

The support may be positioned to be adjacent to any one first valley of an odd numbered first valley and an even numbered first valley, but may not be positioned to be adjacent to the other first valley of the odd and even numbered first valleys.

The support may have a column shape.

One or more supports may be positioned at one edge of each microcavity.

The display device may further include: a common electrode positioned on an upper inner surface of the microcavity; and an alignment layer positioned between the common electrode and the liquid crystal layer.

The display device may further include an insulating layer positioned between the support and the pixel electrode, in which the support may overlap the pixel electrode.

The support may not overlap the pixel electrode.

Another embodiment provides a manufacturing method of a display device comprising: preparing a substrate on which a plurality of pixel areas is to be disposed in a matrix direction; forming a pixel electrode in each pixel area; forming a sacrificial layer on the pixel electrode; forming an opening in the sacrificial layer by removing at least a part of the sacrificial layer; forming a roof layer on the sacrificial layer and forming a support in the opening; forming injection holes by patterning the roof layer so that at least a part of the sacrificial layer is exposed; forming a microcavity between the pixel electrode and the roof layer by removing the sacrificial layer; forming an alignment layer on an inner surface of the microcavity by injecting an aligning agent through one injection hole; and forming a liquid crystal layer in the microcavity by injecting a liquid crystal material through the one injection hole. The support may be formed at each of the opposite edges of two microcavities which are adjacent to each other in a column direction.

The injection holes may be respectively formed at both edges of the microcavity, the support may be formed at one edge of the microcavity to be adjacent to the other injection hole, and the alignment layer may be agglomerated around the support so that the injection hole adjacent to the support is not fully blocked due to the agglomeration phenomenon of the alignment layer.

The microcavities may be disposed in a matrix direction, and a first valley may be formed between the microcavities positioned in different rows.

The support may be formed to be adjacent to any one first valley of an odd numbered first valley and an even numbered first valley, but may not be formed to be adjacent to the other first valley of the odd and even numbered first valleys.

The aligning agent may be injected through the one injection hole which is not adjacent to the support.

The liquid crystal material may be injected through the one injection hole which is not adjacent to the support.

The support may have a column shape.

One or more supports may be formed at one edge of each microcavity.

The manufacturing method may further include forming an overcoat on the roof layer to seal the microcavity.

The support may not overlap the pixel electrode.

According to embodiments of the present invention, it is possible to prevent deformation of roof layers by supports which support the roof layers near the injection holes. Further, it is possible to reduce a processing time for a liquid crystal injection while a position where an agglomeration phenomenon of the alignment material occurs is controlled, because the supports are formed at opposite edges of two different microcavities.

Further, the alignment material agglomerated around the support does not fully block the injection hole, but there is a gap through which air may be discharged, and as a result, the liquid crystal injection is easy, and a vacuum process for removing bubbles which may exist in the microcavity after injecting the liquid crystal is not required.

BRIEF DESCRIPTION OF THE DRAWINGS

FIGS. 11 to 15 are process cross-sectional views illustrating a manufacturing method of a display device according to an embodiment.

DETAILED DESCRIPTION OF CERTAIN INVENTIVE EMBODIMENTS

Figure 1:
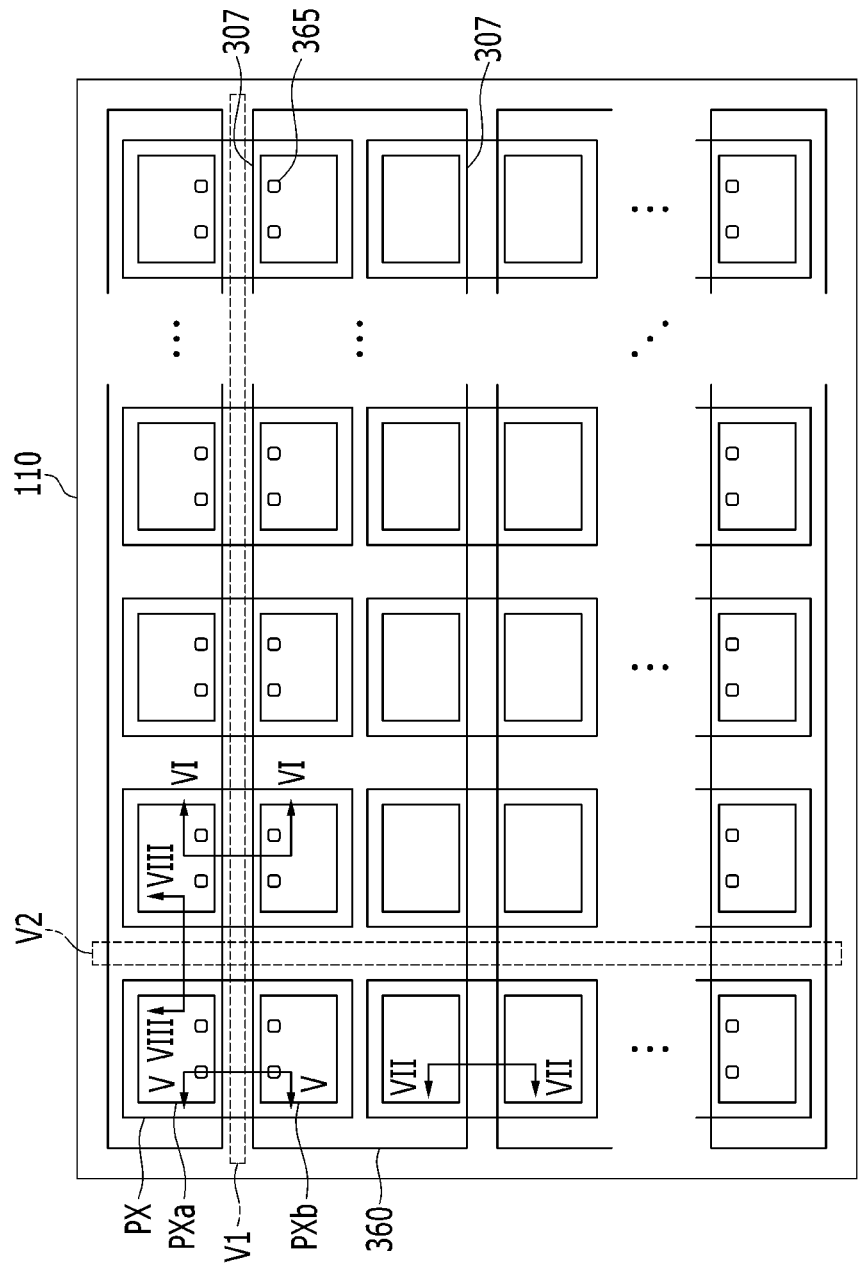
FIGS. 1 and 2 are layout views schematically illustrating a display device according to an embodiment.

The present disclosure will be described more fully hereinafter with reference to the accompanying drawings, in which certain embodiments of the invention are shown. As those skilled in the art would realize, the described embodiments may be modified in various ways, without departing from the spirit or scope of the present invention.

In the drawings, the thickness of layers, films, panels, regions, etc., may be exaggerated for clarity. Like reference numerals generally designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a display device according to an embodiment will be described with reference to the accompanying drawings.

Figure 2:
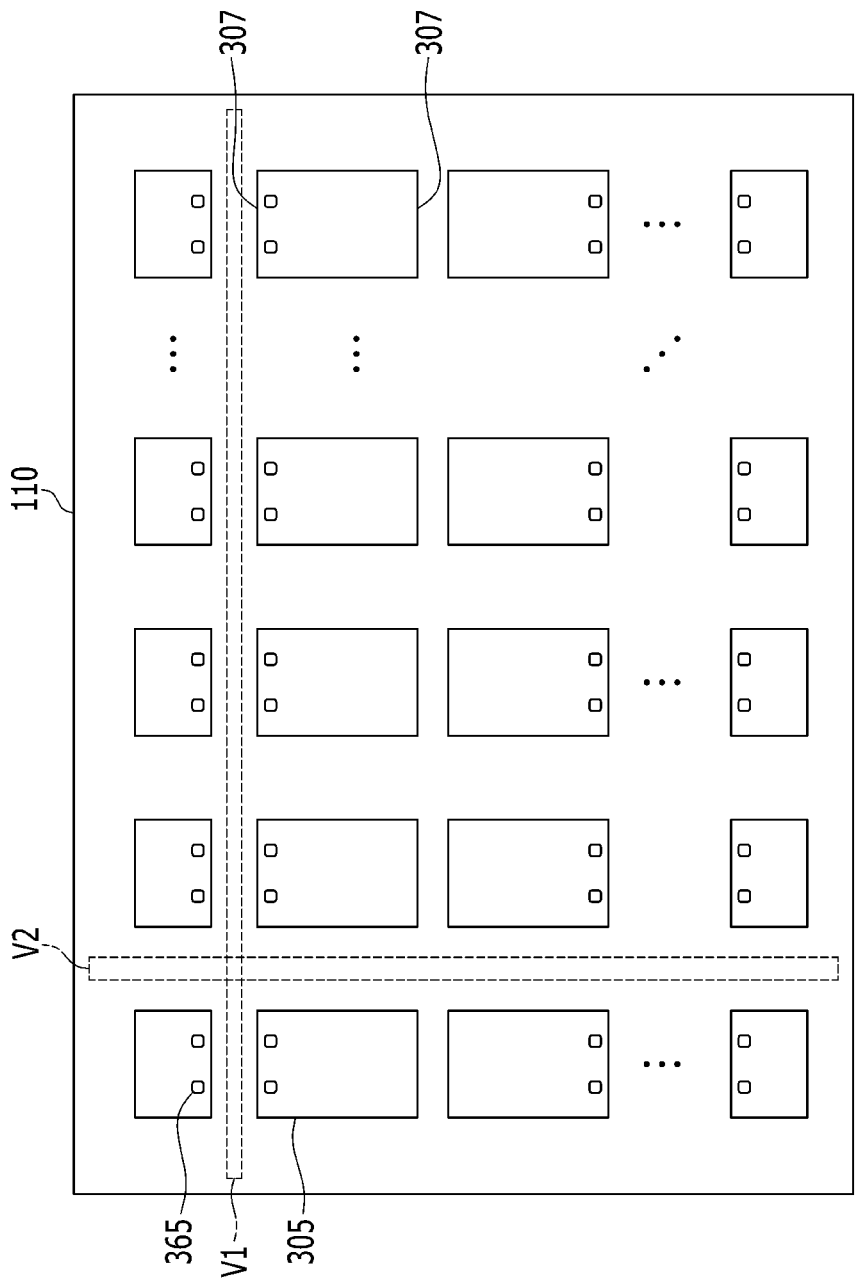

FIGS. 1 and 2 are layout views schematically illustrating a display device according to an embodiment. FIG. 1 illustrates a position of a support 365 based on a pixel area, and FIG. 2 illustrates a formation position of the support 365 based on a microcavity.

A display device according to an embodiment includes a substrate 110 including a transparent insulator such as, for example, glass or plastic, and a roof layer 360 formed on the substrate 110.

The substrate 110 includes a plurality of pixel areas PX. The plurality of pixel areas PX is disposed in a matrix form which includes a plurality of pixel rows and a plurality of pixel columns. Each pixel area PX may include a first subpixel area PXa and a second subpixel area PXb. The first subpixel area PXa and the second subpixel area PXb may be vertically disposed.

A horizontal valley V1 is positioned between the first subpixel area PXa and the second subpixel area PXb in a pixel row direction, and a vertical valley V2 is positioned between the plurality of pixel columns.

The roof layer 360 may be formed along the plurality of pixel rows. In the horizontal valley V1, the roof layer 360 is removed, and an injection hole 307 by which the microcavity 305 covered by the roof layer 360 is exposed outside is formed.

Each of the first subpixel area PXa and the second subpixel area PXb may include one injection hole 307, and the injection holes 307 of the subpixel areas PXa and PXb may be positioned to face each other. For example, the injection hole 307 is formed at a lower edge of the first subpixel area PXa, and the injection hole 307 is formed at an upper edge of the second subpixel area PXb.

The microcavity 305 is formed below the roof layer 360. The roof layer 360 may sag in the injection hole 307 corresponding to an inlet of the microcavity 305. According to an embodiment, the support 365 which is adjacent to the injection hole 307 to support the roof layer 360. As a result, the sagging phenomenon of the roof layer 360 around the injection hole 307 may be prevented.

The support 365 is formed at each of the edges of two different microcavities 305 facing each other. The plurality of microcavities 305 is disposed in a matrix form which includes a plurality of rows and a plurality of columns. For example, the microcavity 305 may have a quadrangular shape, and a lower edge of the microcavity 305 in a first row and an upper edge of the microcavity 305 in a second row face each other. In this case, the supports 365 are formed at a lower edge of the microcavity 305 in the first row and an upper edge of the microcavity 305 in the second row, which face each other, respectively.

The injection holes 307 are formed at two edges of the respective microcavities 305 facing each other. For example, the upper edge and the lower edge of one microcavity 305 face each other, and the injection holes 307 may be formed at an upper edge and a lower edge of the microcavity 305, respectively. In this case, the support 365 may be formed to be adjacent to one injection hole 307 of the injection holes 307 formed at two edges of each microcavity 305 facing each other, but may not be formed at the other injection hole 307. As one example, the support 365 is formed at a lower edge of the microcavity 305 in an odd numbered row, but is not formed at an upper edge. Further, the support 365 is formed at an upper edge of the microcavity 305 in an even numbered row, but is not formed at a lower edge.

The horizontal valley V1 is formed between the microcavities 305 positioned in different rows. When the position of the support 365 is described based on the horizontal valley V1, the support 365 is formed to be adjacent to both sides of the horizontal valley V1. The support 365 is formed to be adjacent to one horizontal valley V1 of the odd numbered horizontal valley V1 and the even numbered horizontal valley V1, but is not formed to be adjacent to the other horizontal valley V1 thereof. For example, the support 365 is formed to be adjacent to both sides of a first horizontal valley V1, but is not formed to be adjacent to both sides of a second horizontal valley V1.

Hereinabove, the case where one microcavity 305 is formed throughout the first subpixel area PXa and the second subpixel area PXb of the two adjacent pixel areas PX is described, but embodiments of the present invention are not limited thereto. For example, one microcavity 305 may be formed in one pixel area PX.

Hereinafter, the display device according to an embodiment will be described in more detail with reference to FIGS. 3 to 8 in addition to FIGS. 1 and 2.

Figure 3:
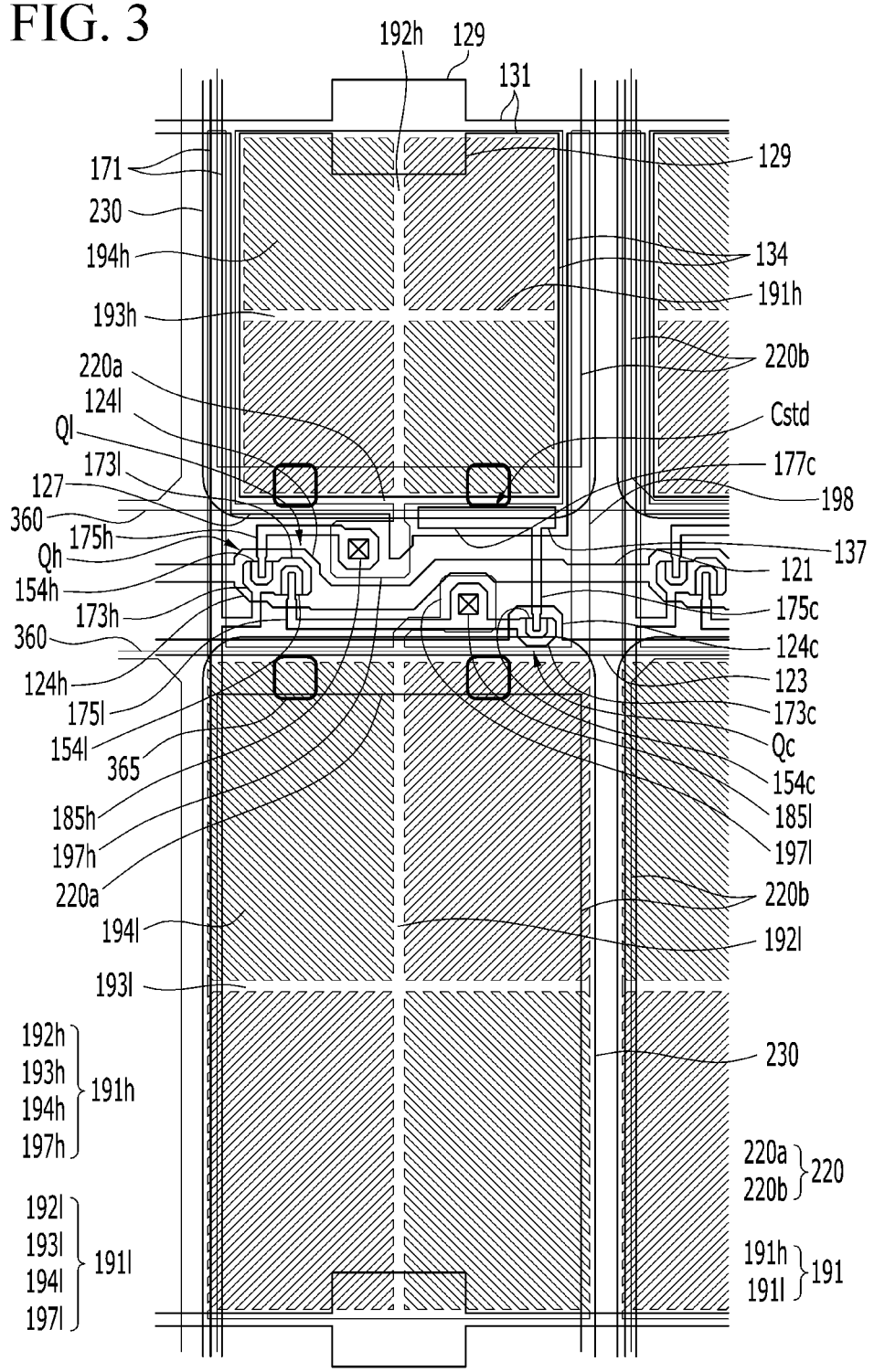
FIG. 3 is a plan view illustrating one pixel of the display device according to an embodiment.
Figure 4:
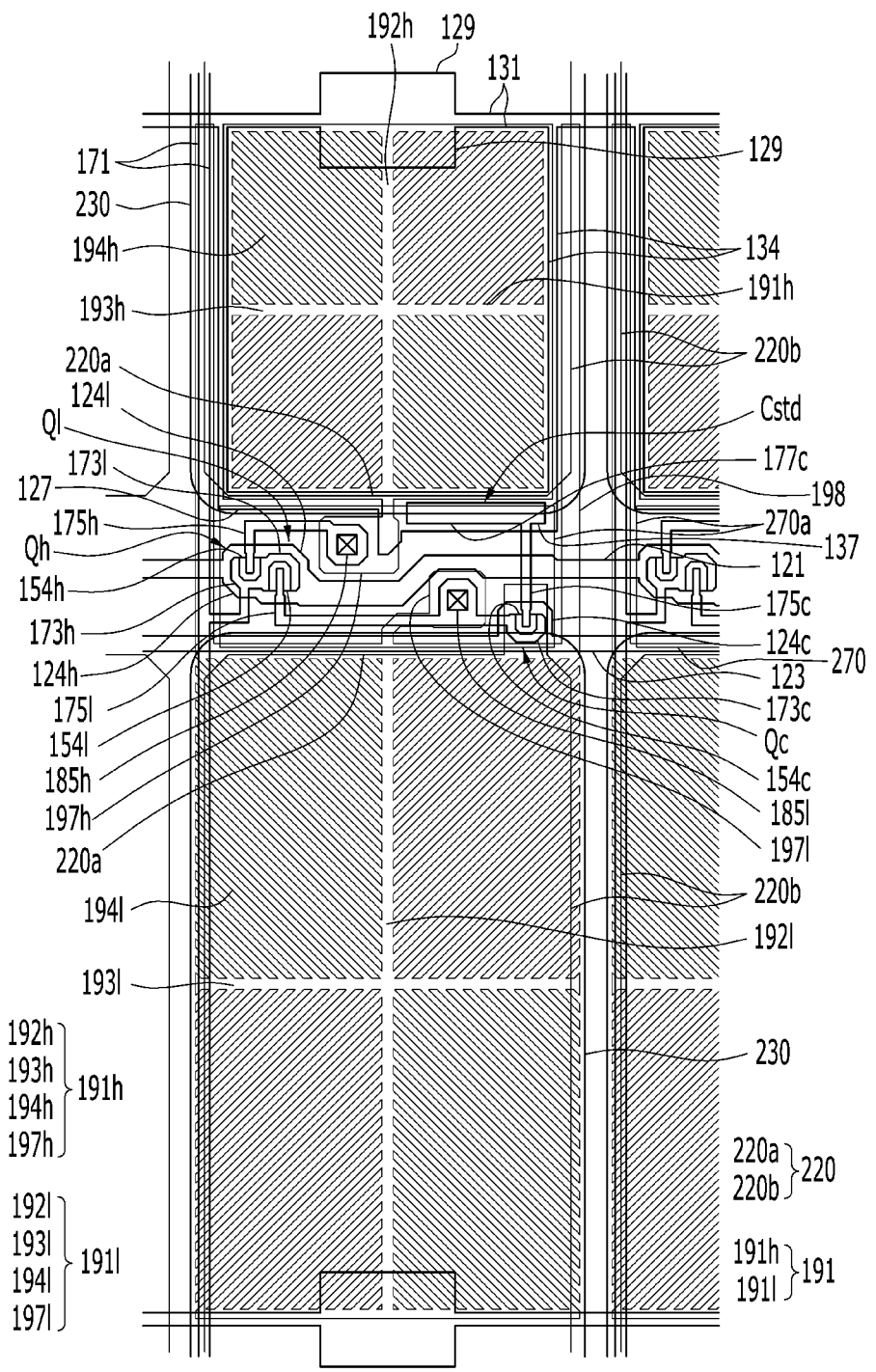
FIG. 4 is a plan view illustrating another pixel of the display device according to an embodiment.

FIG. 3 is a plan view illustrating one pixel of the display device according to an embodiment, and FIG. 4 is a plan view illustrating another pixel of the display device according to an embodiment. FIGS. 5 to 8 illustrate examples of cross sections taken along lines V-V, VI-VI, VII-VII, and VIII-VIII of FIG. 1, respectively.

Figure 5:
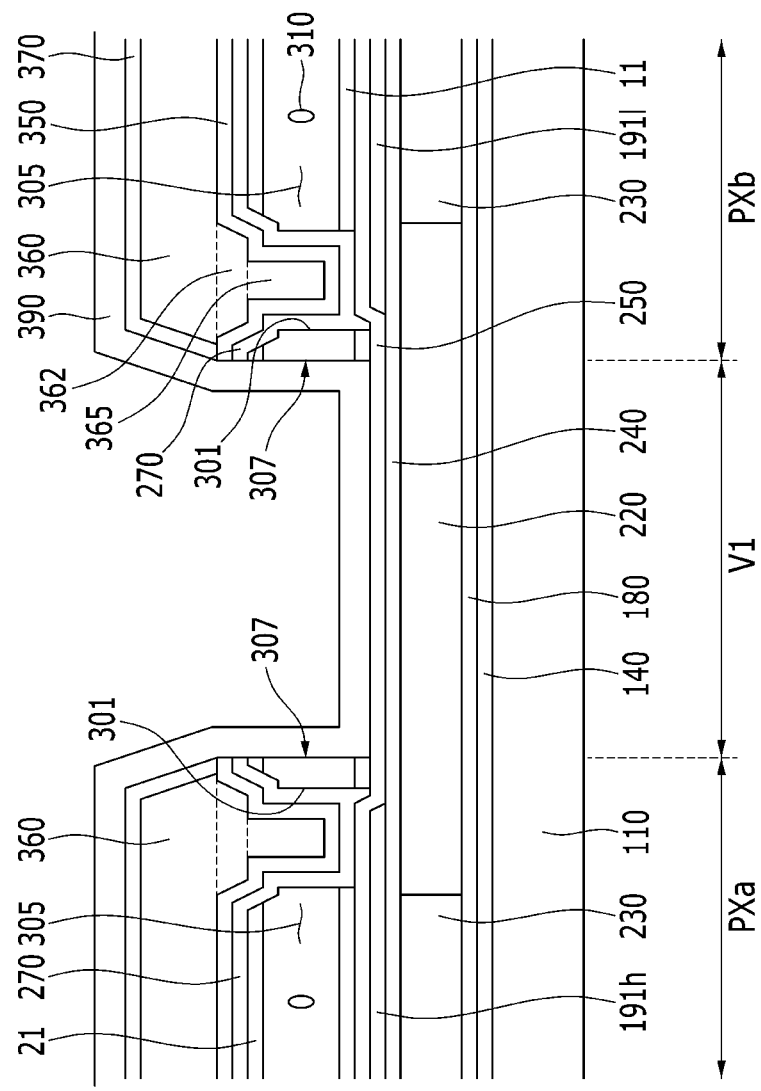
FIG. 5 illustrates an example of a cross section taken along line V-V of FIG. 1.
Figure 6:
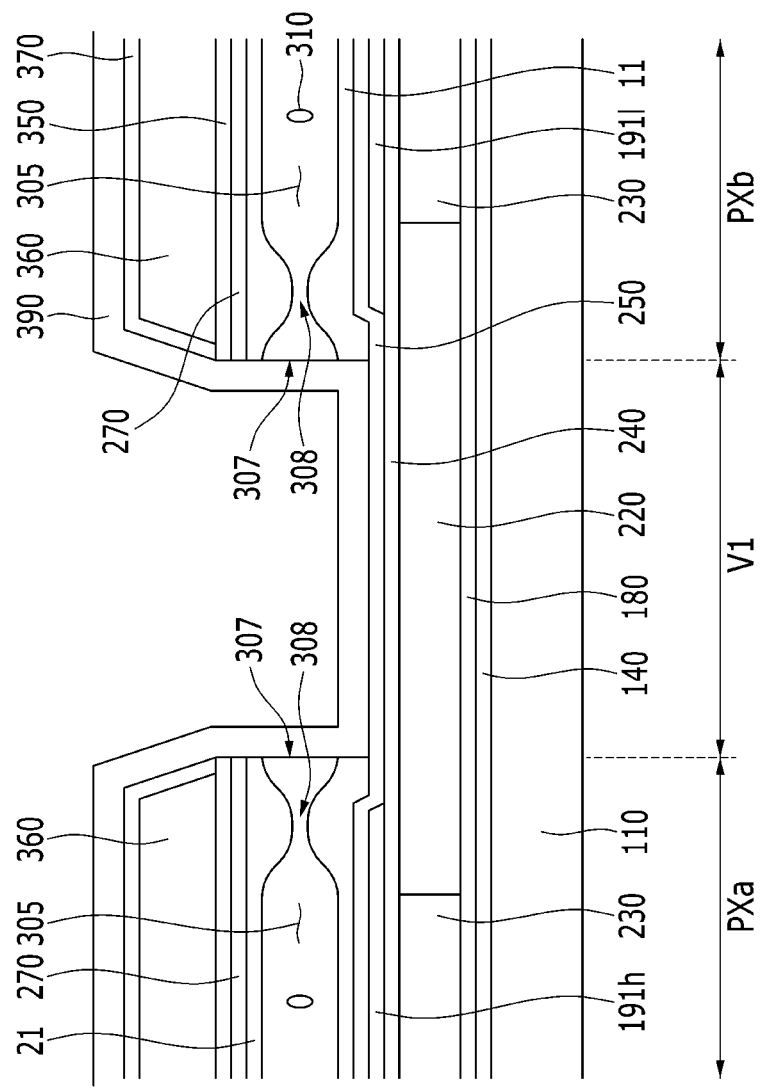
FIG. 6 illustrates an example of a cross section taken along line VI-VI of FIG. 1.
Figure 7:
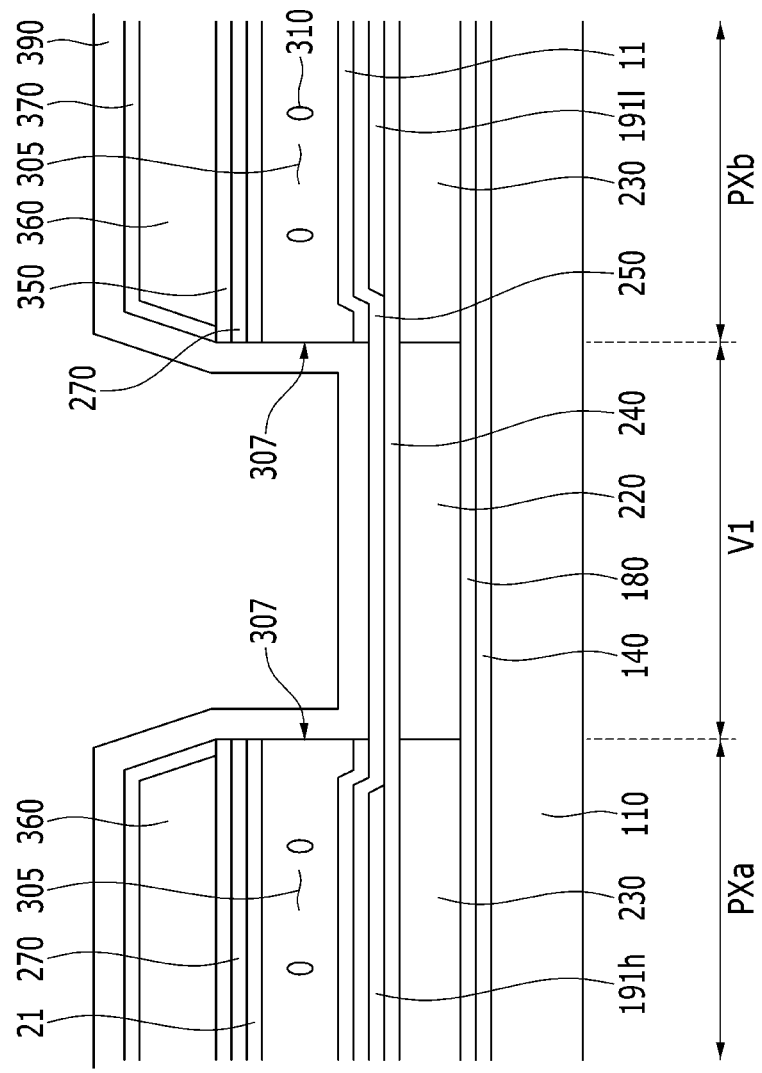
FIG. 7 illustrates an example of a cross section taken along line VII-VII of FIG. 1.
Figure 8:
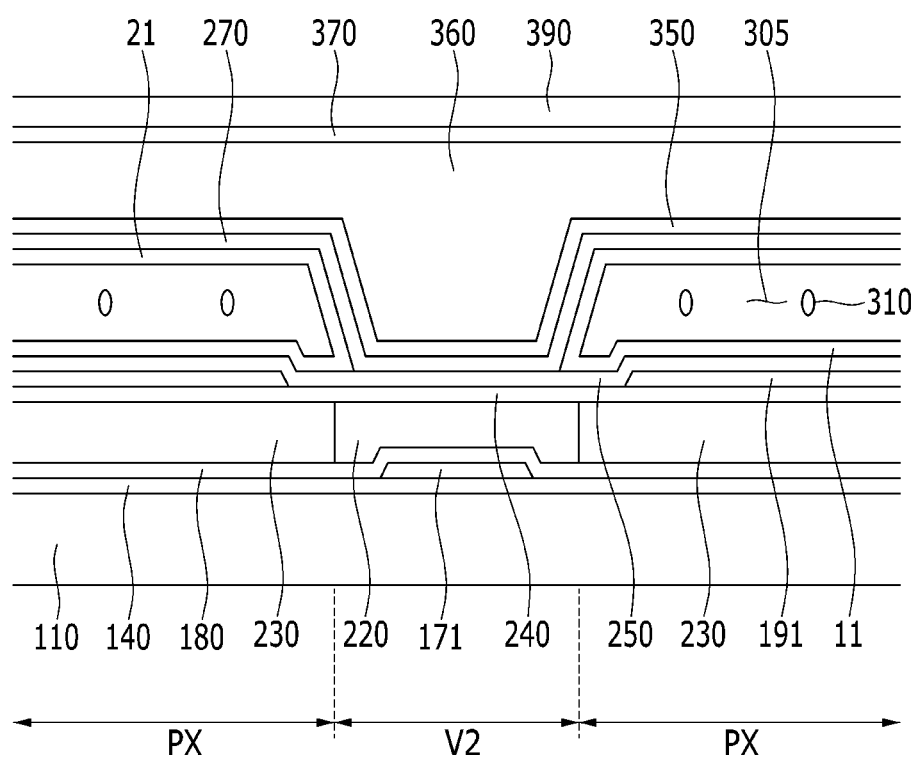
FIG. 8 illustrates an example of a cross section taken along line VIII-VIII of FIG. 1.

FIGS. 3, 5, and 6 illustrate pixels with the supports, and FIGS. 4 and 7 illustrate pixels without the supports.

Referring to FIGS. 1 to 8, a plurality of gate conductors including a plurality of gate lines 121, a plurality of step-down gate lines 123, and a plurality of storage electrode lines 131 are formed on the substrate 110.

The gate line 121 and the step-down gate line 123 mainly extend in a horizontal direction to transfer gate signals. The gate conductor further includes a first gate electrode 124*h* and a second gate electrode 124*l* protruding upward and downward from the gate line 121, and a third gate electrode 124*c* protruding upward from the step-down gate line 123. The first gate electrode 124*h* and the second gate electrode 124*l* are connected with each other to form a protrusion. The protruding form of the first, second, and third gate electrodes 124*h*, 124*l*, and 124*c* may be modified.

The storage electrode line 131 mainly extends in a horizontal direction and transfers a predetermined voltage such as a common voltage Vcom. The storage electrode line 131 includes a storage electrode 129 protruding upward and downward, a pair of vertical portions 134 extending downward to be substantially vertical to the gate line 121, and a horizontal portion 127 connecting ends of the pair of vertical portions 134. The horizontal portion 127 includes a capacitive electrode 137 expanded downward.

A gate insulating layer 140 is formed on the gate conductor 121, 123, 124*h*, 124*l*, 124*c*, and 131. The gate insulating layer 140 may include an inorganic insulating material such as, for example, silicon nitride (SiNx) and silicon oxide (SiOx). Further, the gate insulating layer 140 may be formed as a single layer or a multilayer.

A first semiconductor 154*h*, a second semiconductor 154*l*, and a third semiconductor 154*c* are formed on the gate insulating layer 140. The first to third semiconductors 154*h*, 154*l*, and 154*c* may be positioned on the first to third gate electrodes 124*h*, 124*l*, and 124*c*, respectively. The first semiconductor 154*h* and the second semiconductor 154*l* may be connected to each other, and the second semiconductor 154*l* and the third semiconductor 154*c* may be connected to each other. The first semiconductor 154*h* may be extended to the lower portion of the data line 171. The first to third semiconductors 154*h*, 154*l*, and 154*c* may include amorphous silicon, polycrystalline silicon, metal oxide, and the like.

An ohmic contact (not illustrated) may be formed on each of the first to third semiconductors 154*h*, 154*l*, and 154*c*. The ohmic contact may include silicide or a material such as n+ hydrogenated amorphous silicon in which n-type impurity is doped at a high concentration.

A data conductor including a data line 171, a first source electrode 173*h*, a second source electrode 173*l*, a third source electrode 173*c*, a first drain electrode 175*h*, a second drain electrode 175*l*, and a third drain electrode 175*c* is formed on the first to third semiconductors 154*h*, 154*l*, and 154*c*.

The data line 171 transfers a data signal and mainly extends in a vertical direction to cross the gate line 121 and the step-down gate line 123. Each data line 171 extends toward the first gate electrode 124*h* and the second gate electrode 124*l* and includes a first source electrode 173*h* and a second source electrode 173*l* which are connected with each other.

Each of the first drain electrode 175*h*, the second drain electrode 175*l*, and the third drain electrode 175*c* includes one wide end portion and another rod-shaped end portion. The rod-shaped end portions of the first drain electrode 175*h* and the second drain electrode 175*l* are partially surrounded by the first source electrode 173*h* and the second source electrode 173*l*, respectively. One wide end portion of the second drain electrode 175*l* is again extended to form a third source electrode 173*c* which is bent in a 'U'-lettered shape. A wide end portion 177*c* of the third drain electrode 175*c* overlaps with the capacitive electrode 137 to form a step-down capacitor Cstd, and the rod-shaped end portion is partially surrounded by the third source electrode 173*c*.

The first gate electrode 124*h*, the first source electrode 173*h*, and the first drain electrode 175*h* form a first thin film transistor Qh together with the first semiconductor 154*h*. The second gate electrode 124*l*, the second source electrode 173*l*, and the second drain electrode 175*l* form a second thin film transistor Ql together with the second semiconductor 154*l*. The third gate electrode 124*c*, the third source electrode 173*c*, and the third drain electrode 175*c* form the third thin film transistor Qc together with the third semiconductor 154*c*.

The first semiconductor 154*h*, the second semiconductor 154*l*, and the third semiconductor 154*c* are connected to each other to form a linear shape, and may have substantially the same planar shape as the data conductor 171, 173*h*, 173*l*, 173*c*, 175*h*, 175*l*, and 175*c* and the ohmic contacts therebelow, except for channel regions between the source electrodes 173*h*, 173*l*, and 173*c* and the drain electrodes 175*h*, 175*l*, and 175*c*.

In the first semiconductor 154*h*, an exposed portion which is not covered by the first source electrode 173*h* and the first drain electrode 175*h* is disposed between the first source electrode 173*h* and the first drain electrode 175*h*. In the second semiconductor 154*l*, an exposed portion which is not covered by the second source electrode 173*l* and the second drain electrode 175*l* is disposed between the second source electrode 173*l* and the second drain electrode 175*l*. In addition, in the third semiconductor 154*c*, an exposed portion which is not covered by the third source electrode 173*c* and the third drain electrode 175*c* is disposed between the third source electrode 173*c* and the third drain electrode 175*c*.

A passivation layer 180 is formed on the data conductor 171, 173*h*, 173*l*, 173*c*, 175*h*, 175*l*, and 175*c* and the semiconductors 154*h*, 154*l*, and 154*c* exposed between the respective source electrodes 173*h*/173*l*/173*c* and the respective drain electrodes 175*h*/175*l*/175*c*. The passivation layer 180 may include an organic insulating material or an inorganic insulating material, and may be formed as a single layer or a multilayer.

A color filter 230 in each pixel area PX is formed on the passivation layer 180. Each color filter 230 may display one of the primary colors such as, for example, three primary colors of red, green and blue. The color filter 230 may also display one of cyan, magenta, yellow, and white-based colors. Unlike those illustrated above, the color filter 230 may be elongated in a column direction along a space between the adjacent data lines 171.

A light block 220 is formed in a region between the adjacent color filters 230. The light block 220 is formed to be overlapped with a boundary of the pixel area PX, the thin film transistor, and the support 365 to prevent light leakage. The color filter 230 is formed in each of the first subpixel area PXa and the second subpixel area PXb, and the light block 220 may be formed between the first subpixel area PXa and the second subpixel area PXb.

The light block 220 includes a horizontal light block 220a which extends along the gate line 121 and the step-down gate line 123 to be expanded upward and downward, and covers regions in which the first thin film transistor Qh, the second thin film transistor Ql, and the third thin film transistor Qc are positioned, and a vertical light block 220b which extends along the data line 171. The horizontal light block 220a may be formed at the horizontal valley V1, and the vertical light block 220b may be formed at the vertical valley V2. The color filter 230 and the light block 220 may overlap with each other in a partial region.

A first insulating layer 240 may be further formed on the color filter 230 and the light block 220. The first insulating layer 240 may include an inorganic insulating material such as, for example, silicon nitride (SiNx) and silicon oxide (SiOx). The first insulating layer 240 serves to protect the color filter 230 including the organic material and the light block 220, and may be omitted if necessary.

In the first insulating layer 240, the light block 220, and the passivation layer 180, a first contact hole 185h and a second contact hole 185l, which expose the wide end portion of the first drain electrode 175h and the wide end portion of the second drain electrode 175l, respectively, are formed.

A pixel electrode 191 is formed on the first insulating layer 240. The pixel electrode 191 may include a transparent conductive material such as, for example, indium tin oxide (ITO) and indium zinc oxide (IZO).

The pixel electrode 191 includes a first subpixel electrode 191h and a second subpixel electrode 191l which are separated from each other with the gate line 121 and the step-down gate line 123 therebetween, and disposed above and below the pixel area PX based on the gate line 121 and the step-down gate line 123 to be adjacent to each other in a column direction. The first subpixel electrode 191h and the second subpixel electrode 191l are separated from each other with the horizontal valley V1 therebetween, the first subpixel electrode 191h is positioned in the first subpixel area PXa, and the second subpixel electrode 191l is positioned in the second subpixel area PXb.

The first subpixel electrode 191h and the second subpixel electrode 191l are connected with the first drain electrode 175h and the second drain electrode 175l through the first contact hole 185h and the second contact hole 185l, respectively. Accordingly, when the first thin film transistor Qh and the second thin film transistor Ql are turned on, the first subpixel electrode 191h and the second subpixel electrode 191l receive data voltages from the first drain electrode 175h and the second drain electrode 175l.

An overall shape of each of the subpixel electrode 191h and the second subpixel electrode 191l is a quadrangle, and the first subpixel electrode 191h and the second subpixel electrode 191l include cross stems including horizontal stems 193h and 193l and vertical stems 192h and 192l crossing the horizontal stems 193h and 193l, respectively. Further, the first subpixel electrode 191h and the second subpixel electrode 191l include a plurality of minute branches 194h and 194l, and protrusions 197h and 197l protruding downward or upward from edge sides of the subpixel electrodes 191h and 191l, respectively.

The pixel electrode 191 is divided into four subregions by the horizontal stems 193h and 193l and the vertical stems 192h and 192l. The minute branches 194h and 194l obliquely extend from the horizontal stems 193h and 193l and the vertical stems 192h and 192l, and the extending direction may form an angle of approximately 45 degrees or 135 degrees with the gate line 121 or the horizontal stems 193h and 193l. Further, extending directions of the minute branches 194h and 194l of the two adjacent subregions may be perpendicular to each other.

The first subpixel electrode 191h may further include an outer stem surrounding the outside, and the second subpixel electrode 191l further includes horizontal portions positioned at an upper end and a lower end, and left and right vertical portions 198 positioned at left and right sides of the first subpixel electrode 191h. The left and right vertical portions 198 may prevent capacitive coupling between the data line 171 and the first subpixel electrode 191h.

The layout form of the pixel area, the structure of the thin film transistor, and the shape of the pixel electrode described above are just examples, and embodiments of the present invention are not limited thereto and may be variously modified.

A second insulating layer 250 may be further formed on the pixel electrode 191. The second insulating layer 250 may include an inorganic insulating material such as, for example, silicon nitride (SiNx) and silicon oxide (SiOx). The second insulating layer 250 serves to protect the pixel electrode 191 and may be omitted if necessary.

The common electrode 270 is formed on the pixel electrode 191 so as to be spaced apart from the pixel electrode 191 at a predetermined distance. The microcavity 305 is formed between the pixel electrode 191 and the common electrode 270. The microcavity 305 is surrounded by the pixel electrode 191 and the common electrode 270. A width and an area of the microcavity 305 may be variously modified according to a size and a resolution of the display device.

Even though the common electrode 270 is formed to be overlapped with the pixel electrode 191, since the second insulating layer 250 is formed on the pixel electrode 191, it is possible to prevent the common electrode 270 and the pixel electrode 191 from being short-circuited by contacting each other.

According to an embodiment, the common electrode 270 may be formed directly on the second insulating layer 250. The microcavity 305 is not formed between the pixel electrode 191 and the common electrode 270, and the common electrode 270 and the pixel electrode 191 may be formed with the second insulating layer 250 therebetween. In this case, the microcavity 305 may be formed on the common electrode 270.

The common electrode 270 may include a transparent conductive material such as, for example, indium tin oxide (ITO) and indium zinc oxide (IZO). A predetermined voltage may be applied to the common electrode 270, and an electric field may be generated between the pixel electrode 191 and the common electrode 270.

A first alignment layer 11 is formed on the pixel electrode 191. The first alignment layer 11 may also be formed directly on the second insulating layer 250 which is not covered by the pixel electrode 191.

A second alignment layer 21 is formed below the common electrode 270 to face the first alignment layer 11.

The first alignment layer 11 and the second alignment layer 21 may be formed as vertical alignment layers, and include an alignment layer formation material (simply, referred to as an "alignment material") such as, for example, polyimide (PI), polyamic acid, and polysiloxane. The first and second alignment layers 11 and 21 may be connected to each other at an edge of the pixel area PX.

A liquid crystal layer configured by liquid crystal molecules 310 is formed in the microcavity 305 positioned between the pixel electrode 191 and the common electrode 270. The liquid crystal molecules 310 have negative dielectric anisotropy, and may stand up in a vertical direction to the substrate 110 while the electric field is not applied. That is, vertical alignment may be performed.

The first subpixel electrode 191h and the second subpixel electrode 191l to which the data voltages are applied generate an electric field together with the common electrode 270 to determine directions of the liquid crystal molecules 310 positioned in the microcavity 305 between the two electrodes 191 and 270. An amount of light passing through the liquid crystal layer varies according to the determined directions of the liquid crystal molecules 310.

A third insulating layer 350 may be further formed on the common electrode 270. The third insulating layer 350 may include an inorganic insulating material such as, for example, silicon nitride ($SiN_x$) and silicon oxide ($SiO_x$), and may be omitted if necessary.

A roof layer 360 is formed on the third insulating layer 350. The roof layer 360 may include an organic material. The microcavity 305 is formed below the roof layer 360, and the roof layer 360 is hardened by a curing process to maintain a stereoscopic shape of the microcavity 305. The roof layer 360 is formed to be spaced apart from the pixel electrode 191 with the microcavity 305 therebetween.

The roof layer 360 is positioned in each pixel area PX and the vertical valley V2 along a pixel row, and is not positioned at the horizontal valley V1. The roof layer 360 is not formed between the first subpixel area PXa and the second subpixel area PXb. In each of the first subpixel area PXa and the second subpixel area PXb, the microcavity 305 is formed below each roof layer 360, but at the vertical valley V2, the microcavity 305 is not formed below the roof layer 360. Accordingly, a thickness of the roof layer 360 positioned at the vertical valley V2 may be larger than a thickness of the roof layer 360 positioned at each of the first subpixel area PXa and the second subpixel area PXb. An upper side and both sides of the microcavity 305 are formed to be covered by the roof layer 360.

An injection hole 307 exposing a part of the microcavity 305 is formed in the roof layer 360. The injection holes 307 may be formed to face each other at the edges of the first subpixel area PXa and the second subpixel area PXb, as described above. For example, the injection holes 307 may correspond to the lower edge of the first subpixel area PXa and the upper edge of the second subpixel area PXb to expose the side of the microcavity 305. When a formation position of the injection hole 307 is described based on the microcavity 305, the injection hole 307 is formed at two edges of each microcavity 305 facing each other. Since the microcavity 305 is exposed by the injection hole 307, an aligning agent, a liquid crystal material, or the like may be injected into the microcavity 305 through the injection hole 307.

The support 365 is adjacent to the injection hole 307 to have a column shape at the microcavity 305. The support 365 is formed at each of the edges of two different microcavities facing each other, as illustrated in FIGS. 3 and 5.

Two injection holes 307 are formed at one microcavity 305. For example, the injection holes 307 are positioned at an upper edge and a lower edge of one microcavity 305, respectively. The support 365 is formed only at one of the two injection holes 307, but is not formed at the other injection hole 307. For example, the support 365 is formed to be adjacent to the injection hole 307 positioned at the upper edge of the microcavity 305, and the support 365 may not be formed at a position which is adjacent to the injection hole 307 positioned at the lower edge of the microcavity 305.

The support 365 is formed to be adjacent to both sides of the odd numbered horizontal valley V1 as illustrated in FIGS. 1, 3, and 5, but is not formed to be adjacent to both sides of the even numbered horizontal valley V1 as illustrated in FIGS. 1, 4, and 7. According to an embodiment, the support 365 may be formed to be adjacent to both sides of the even numbered horizontal valley V1, but may not be formed to be adjacent to both sides of the odd numbered horizontal valley V1.

The first alignment layer 11 and the second alignment layer 21 may be formed by injecting an aligning agent in which an alignment material is dissolved in a solvent. In a drying process of the aligning agent, a solid is concentrated at a place, and as a result, an alignment layer agglomeration phenomenon in which the alignment material is agglomerated occurs. At a place where the agglomeration phenomenon of the alignment layer occurs, a light leakage phenomenon, transmittance deterioration, or the like may occur, and as a result, display quality deteriorates.

In one embodiment, since the support 365 is formed to be adjacent to the injection hole 307 positioned at one edge of the microcavity 305, capillary forces in the two injection holes 307 formed in one microcavity 305 are different from each other. Since the capillary force in the injection hole 307 with the support 365 is relatively large, the agglomeration phenomenon of the alignment layer occurs at a place where the support 365 is formed (around the injection hole 307 with the support 365). Accordingly, the agglomeration phenomenon of the alignment layer may occur at the edge of the first subpixel area PXa or the second subpixel area PXb due to the support 365 according to an embodiment. Further, as illustrated in FIG. 5, since the light block 220 is formed to be overlapped with the support 365, the agglomeration phenomenon of the alignment layer may be prevented from being recognized as a defect. Since an area of forming the light block 220 may be reduced as the support 365 is formed to be closer to the injection hole 307 (see FIG. 10), an aperture ratio may be further improved.

Due to the agglomeration phenomenon of the alignment layer around the injection hole 307 formed to be adjacent to the support 365, the injection hole 307 may be fully blocked by the support 365 and the alignment layer, but the injection hole 307 is not fully blocked and may have a gap through which air is discharged. The degree that the injection hole 307 is blocked by such as an agglomeration phenomenon of the alignment layer may be controlled according to a kind of alignment material, a concentration of the aligning agent, and the like. For example, when a polyimide solution of about 0.5% is used as an aligning agent, the injection hole 307 may not be fully blocked by the agglomeration phenomenon of the alignment layer. In one embodiment, the injection hole 307 is not fully blocked by the agglomeration phenomenon of the alignment layer, but as illustrated in FIG. 6 which illustrates a cross section between the supports 365, even though the agglomeration phenomenon of the alignment layer occurs around the injection hole 307, a gap 308 through which air is discharged exists. As a result, when the liquid crystal is filled into the microcavity 305 through the injection hole 307 which is not formed to be adjacent to the support 365, the air in the microcavity 305 may be discharged through the gap 308, and as a result, bubbles do not exist in the microcavity 305 after the liquid crystal is filled.

The sagging phenomenon of the roof layer 360 may occur at a place where the agglomeration phenomenon of the alignment layer occurs. In the display device according to an embodiment, since the support 365 is formed at the point where the agglomeration phenomenon of the alignment layer occurs to support the roof layer 360, the deformation of the roof layer 360 may be prevented.

The support 365 is connected with the roof layer 360, and may include the same material as the roof layer 360. The third insulating layer 350 and the common electrode 270 may be further positioned below the support 365. The support 365 may be overlapped with the pixel electrode 191, and in this case, the common electrode 270 may also be overlapped with the pixel electrode 191. Since the second insulating layer 250 is formed on the pixel electrode 191, a short circuit between the common electrode 270 and the pixel electrode 191 may be prevented from occurring.

According to an embodiment, the support 365 may include a different material from the roof layer 360, and the third insulating layer 350 and the common electrode 270 may not be positioned below the support 365. In this case, the support 365 may be formed directly on the pixel electrode 191, or formed directly on the second insulating layer 250 or the first insulating layer 240. Further, by using a minute slit exposure method when the light block 220 or the insulating layers 240 and 250 are formed, a part of the light block 220 or the insulating layers 240 and 250 protrudes to form the support 365.

A plurality of supports 365, for example, two or three supports 365 may be formed at one edge of one microcavity 305, and the number of supports 365 may be increased or decreased according to a size of the microcavity 305. A planar shape of the support 365 is illustrated approximately as a quadrangle, but is not limited thereto, and may be various shapes such as a circle and a polygon.

A step 362 may be further formed between the support 365 and the roof layer 360. A width of the step 362 may be larger than a width of the support 365. The step 362 may include the same material as the support 365. Further, the step 362, the support 365, and the roof layer 360 may include the same material.

A fourth insulating layer 370 may be further formed on the roof layer 360. The fourth insulating layer 370 may include an inorganic insulating material such as, for example, silicon nitride (SiNx) and silicon oxide (SiOx). The fourth insulating layer 370 may be formed to cover an upper surface and a side of the roof layer 360. The fourth insulating layer 370 serves to protect the roof layer 360 including an organic material, and may be omitted if necessary.

An overcoat 390 may be formed on the fourth insulating layer 370. The overcoat 390 is formed to cover the injection hole 307 exposing the part of the microcavity 305 to the outside. The overcoat 390 seals the microcavity 305 so that the liquid crystal molecules 310 are not leaked after the liquid crystal is filled into the microcavity 305. Since the overcoat 390 contacts the liquid crystal molecules 310, the overcoat 390 may include a material such as, for example, parylene, which does not react with liquid crystal molecules 310.

The overcoat 390 may be formed by a multilayer such as a double layer and a triple layer. The double layer is configured by two layers made of different materials. The triple layer is configured by three layers, and materials of adjacent layers are different from each other. For example, the overcoat 390 may include a layer including an organic insulating material and a layer including an inorganic insulating material.

Although not illustrated, polarizers may be further formed on upper and lower surfaces of the display device. The polarizers may include a first polarizer and a second polarizer. The first polarizer may be attached onto the lower surface of the substrate 110, and the second polarizer may be attached onto the overcoat 390.

Next, a display device according to another embodiment will be described below with reference to FIGS. 9 and 10. Since the display device illustrated in FIGS. 9 and 10 is almost the same as the display device illustrated in FIGS. 1 to 8, differences will be mainly described.

Figure 9:
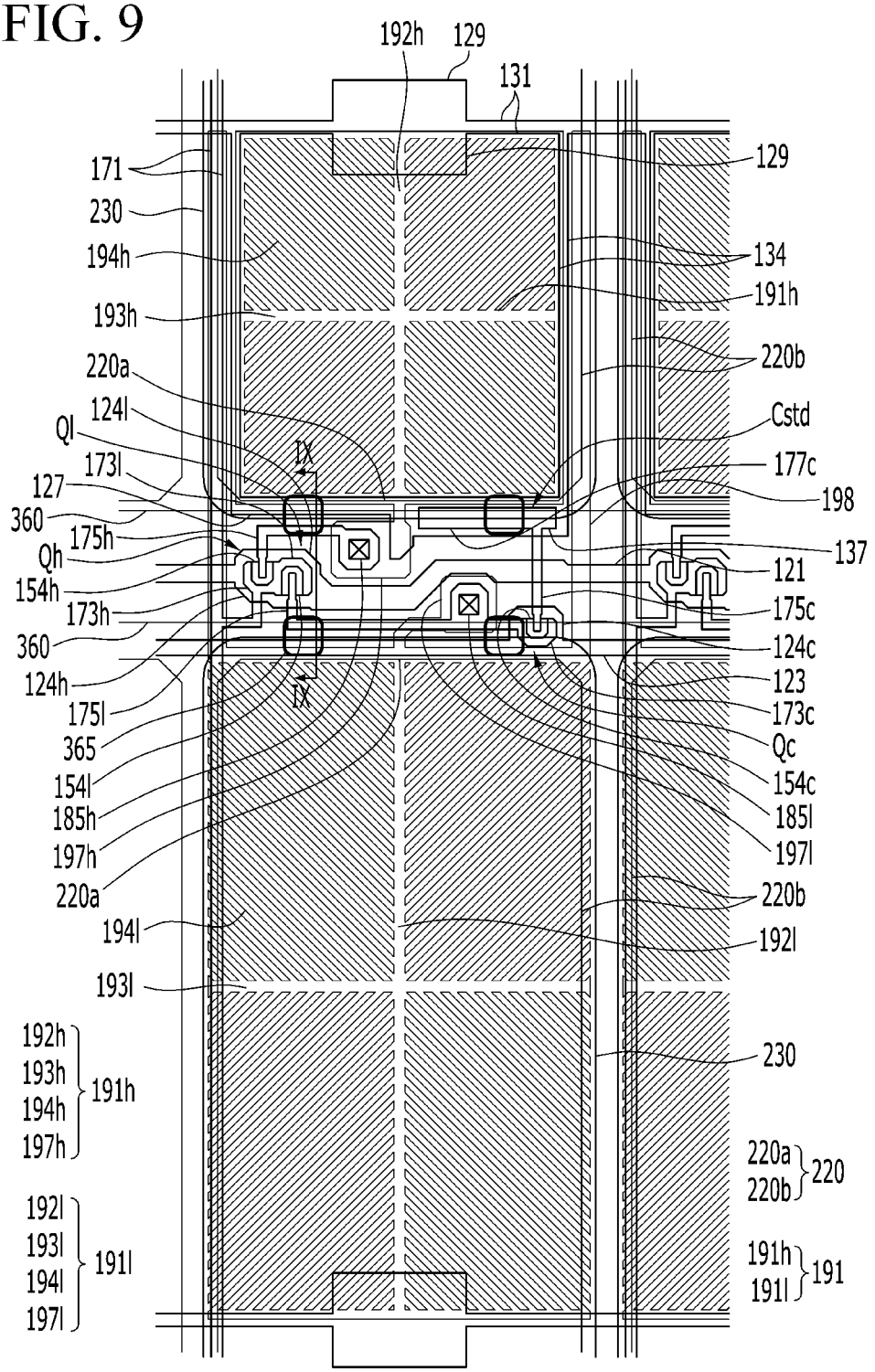
FIG. 9 is a plan view illustrating one pixel of the display device according to an embodiment.
Figure 10:
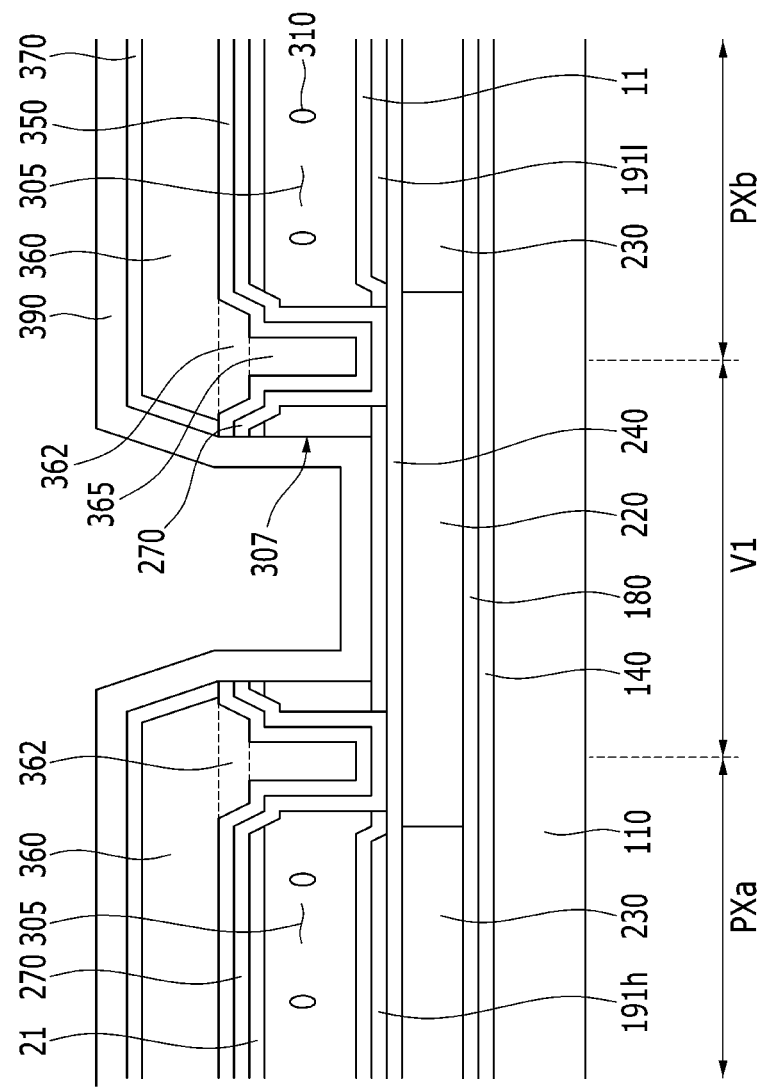
FIG. 10 illustrates an example of a cross section taken along line IX-IX of FIG. 9.

FIG. 9 is a plan view illustrating one pixel of a display device according to another embodiment, and FIG. 10 is a cross-sectional view illustrating a part of the display device of FIG. 9 taken along line IX-IX according to an embodiment.

Referring to FIGS. 9 to 10, a thin film transistor and a pixel electrode 191 connected to the thin film transistor are formed on a substrate 110. The roof layer 360 is formed on the pixel electrode 191 to be spaced apart from each other with the microcavity 305 therebetween, and the support 365 supporting the microcavity 305 is formed to be adjacent to the injection hole 307. A liquid crystal layer constituted by liquid crystal molecules 310 is formed in the microcavity 305, and an overcoat 390 is formed on the roof layer 360 to seal the microcavity 305.

The support 365 is connected with the roof layer 360, and may be made of the same as the roof layer 360. The support 365 may be formed to be closer to the injection hole 307 than the above embodiment. Accordingly, the agglomeration phenomenon of the alignment layer may occur outside of the first and second subpixel areas PXa and PXb, and as a result, an area forming the light block 220 may be reduced, and an aperture ratio may be increased. Like the above embodiment, even though the agglomeration phenomenon of the alignment layer occurs around the injection hole 307, the gap (see FIG. 6) through which the air is discharged exists, and as a result, the air in the microcavity 305 may be discharged through the gap during the filling of the liquid crystal. By using a minute slit exposure method when the light block 220 or the insulating layers 240 and 250 is(are) formed, a part of the light block 220 or the insulating layers 240 and 250 protrudes to form the support 365.

A third insulating layer 350 and a common electrode 270 may be further positioned below the support 365. The support 365 may be formed so as not to be overlapped with the pixel electrode 191. Accordingly, even though a separate insulating layer is not formed between the pixel electrode 191 and the common electrode 270, the common electrode 270 and the pixel electrode 191 may be prevented from being short-circuited. In the above embodiment, since the support 365 and the pixel electrode 191 are overlapped with each other, the second insulating layer (250 of FIG. 5) is formed so that the common electrode 270 positioned below the support 365 is not short-circuited from the pixel electrode 191. In this embodiment, the support 365 and the pixel electrode 191 are not overlapped with each other, and as a result, the short circuit between the common electrode and the pixel electrode 191 may be prevented without the second insulating layer.

Next, a manufacturing method of a display device according to an embodiment will be described below with reference to FIGS. 11 to 15. Further, the manufacturing method will be described with reference to FIGS. 1 to 8 together.

FIGS. 11 to 15 are process cross-sectional views illustrating a manufacturing method of a display device according to an embodiment.

Figure 11:
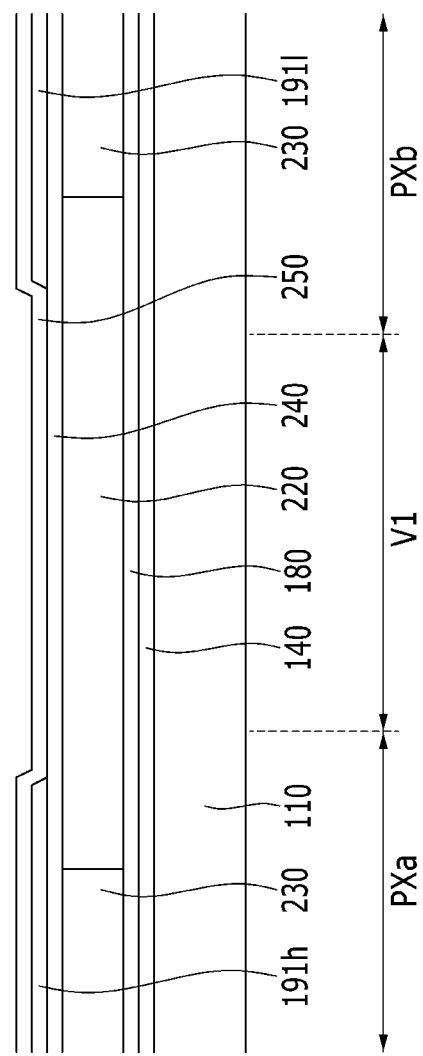

As illustrated in FIG. 11, a gate line 121 and a step-down gate line 123 extending in a horizontal direction are formed on a substrate 110 including glass or plastic, and a first gate electrode 124*h*, a second gate electrode 124*l*, and a third gate electrode 124*c* which protrude from the gate line 121 are formed. Further, a storage electrode line 131 spaced apart from the gate line 121, the step-down gate line 123, and the gate electrodes 124*h*, 124*l* and 124*c* may be formed together.

Next, a gate insulating layer 140 is formed on the entire surface of the substrate 110 with the gate line 121, the step-down gate line 123, the first to third gate electrodes 124*h*, 124*l*, and 124*c*, and the storage electrode line 131 by using an inorganic insulating material such as, for example, silicon oxide (SiOx) or silicon nitride (SiNx). The gate insulating layer 140 may be formed by a single layer or a multilayer.

Next, a first semiconductor 154*h*, a second semiconductor 154*l*, and a third semiconductor 154*c* are formed by depositing and then patterning a semiconductor material such as, for example, amorphous silicon, polycrystalline silicon, and metal oxide on the gate insulating layer 140. The first semiconductor 154*h* may be positioned on the first gate electrode 124*h*, the second semiconductor 154*l* may be positioned on the second gate electrode 124*l*, and the third semiconductor 154*c* may be positioned on the third gate electrode 124*c*.

Next, a data line 171 extending in a vertical direction is formed by depositing and then patterning a metal material. The metal material may be formed by a single layer or a multilayer. Further, a first source electrode 173*h* protruding above the first gate electrode 124*h* from the data line 171, and a first drain electrode 175*h* spaced apart from the first source electrode 173*h* are formed together. Further, a second source electrode 173*l* connected with the first source electrode 173*h*, and a second drain electrode 175*l* spaced apart from the second source electrode 173*l* are formed together. Further, a third source electrode 173*c* extended from the second drain electrode 175*l*, and a third drain electrode 175*c* spaced apart from the third source electrode 173*c* are formed together.

The first to third semiconductors 154*h*, 154*l*, and 154*c*, the data line 171, the first to third source electrodes 173*h*, 173*l*, and 173*c*, and the first to third drain electrodes 175*h*, 175*l*, and 175*c* may be formed by sequentially depositing and then simultaneously patterning a semiconductor material and a metal material. In this case, the first semiconductor 154*h* is extended to the lower portion of the data line 171.

Next, a passivation layer 180 is formed on the data line 171, the first to third source electrodes 173*h*, 173*l*, and 173*c*, the first to third drain electrodes 175*h*, 175*l*, and 175*c*, and the semiconductors 154*h*, 154*l*, and 154*c* exposed between the respective source electrodes 173*h*, 173*l*, and 173*c* and the respective drain electrodes 175*h*, 175*l*, and 175*c*. The passivation layer 180 may include organic insulating material or an inorganic insulating material, and may be formed as a single layer or a multilayer.

Next, a color filter 230 is formed in each pixel area PX on the passivation layer 180. The color filter 230 is formed in each of the first subpixel area PXa and the second subpixel area PXb, and may not be formed at the horizontal valley V1. Further, the color filters 230 having the same color may be formed in a column direction of the plurality of pixel areas PX. In the case of forming the color filters 230 having three colors, a first colored color filter 230 may be first formed, and then a second colored color filter 230 may be formed by shifting a mask. Next, the second colored color filter 230 may be formed, and then a third colored color filter may be formed by shifting the mask.

Next, a light block 220 is formed on a boundary of each pixel area PX on the passivation layer 180 and the thin film transistor. The light block 220 may be formed even at the horizontal valley V1 positioned between the first subpixel area PXa and the second subpixel area PXb. Further, the light block 220 is formed even at one edge of each pixel area PX. The light block 220 is formed to correspond to a portion which is overlapped with a support 365 to be formed below. According to an embodiment, after the light block 220 is first formed, the color filter 230 may be formed.

Next, a first insulating layer 240 including an inorganic insulating material such as, for example, silicon nitride (SiNx) and silicon oxide (SiOx) is formed on the color filter 230 and the light block 220.

Next, a first contact hole 185*h* is formed so as to expose a part of the first drain electrode 175*h*, and a second contact hole 185*l* is formed so as to expose a part of the second drain electrode 175*l*, by etching the passivation layer 180, the light block 220, and the first insulating layer 240.

Next, a first subpixel electrode 191*h* is formed in the first subpixel area PXa, and a second subpixel electrode 191*l* is formed in the second subpixel area PXb, by depositing and then patterning a transparent material such as, for example, indium tin oxide (ITO) and indium zinc oxide (IZO) on the first insulating layer 240. The first subpixel electrode 191*h* and the second subpixel electrode 191*l* are separated from each other with the horizontal valley V1 therebetween. The first subpixel electrode 191*h* is connected with the first drain electrode 175*h* through the first contact hole 185*h*, and the second subpixel electrode 191*l* is connected to the second drain electrode 175*l* through the second contact hole 185*l*.

Horizontal stems 193*h* and 193*l*, and vertical stems 192*h* and 192*l* crossing the horizontal stems 193*h* and 193*l* are formed at the first subpixel electrode 191*h* and the second subpixel electrode 191*l*, respectively. Further, a plurality of minute branches 194*h* and 194*l*, which obliquely extends from the horizontal stems 193*h* and 193*l* and the vertical stems 192*h* and 192*l*, is formed.

Next, a second insulating layer 250 may be further formed on the pixel electrode 191 with an inorganic insulating material such as, for example, silicon nitride (SiNx) and silicon oxide (SiOx). The second insulating layer 250 is a member formed to prevent a short circuit between the common electrode 270 and the pixel electrode 191 positioned below the support 365 to be formed below. Accordingly, when the support 365 is formed so as not to be overlapped with the pixel electrode 191, the forming process of the second insulating layer 250 may be omitted.

Figure 12:
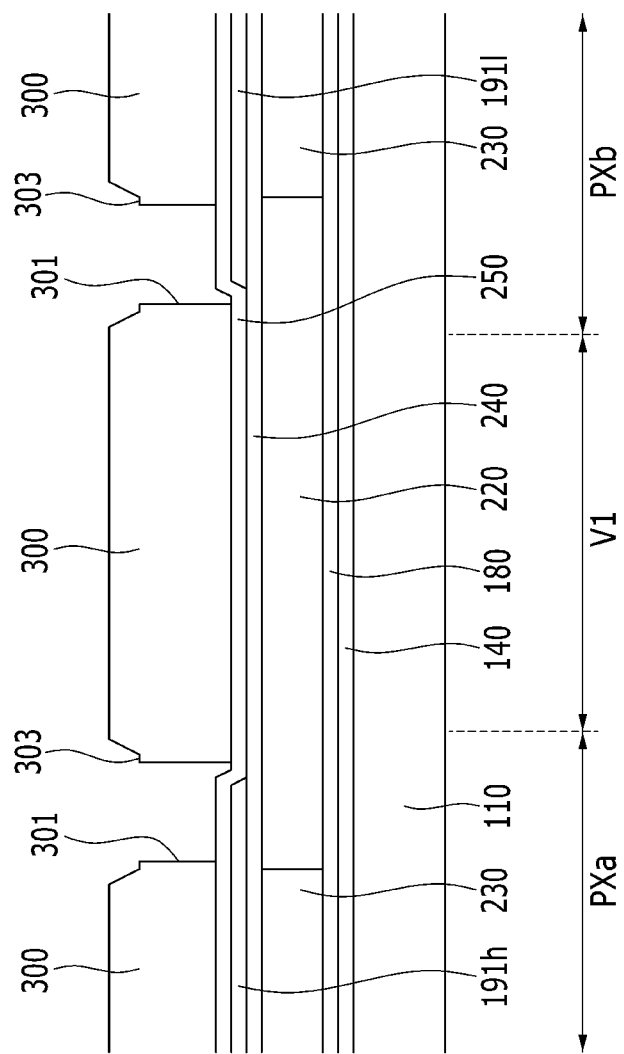

As illustrated in FIG. 12, a sacrificial layer 300 is formed by coating a photosensitive organic material on the pixel electrode 191 and performing a photolithography process.

The sacrificial layers 300 are formed to be connected to each other along the plurality of pixel columns. The sacrificial layer 300 is formed to cover each pixel area PX, and formed to cover the horizontal valley V1 positioned between the first subpixel area PXa and the second subpixel area PXb. The photosensitive organic material positioned at the vertical valley V2 is removed through a photolithography process. Further, an opening 301 is formed by removing a partial region of the sacrificial layer 300 through the photolithography process. The opening 301 may be formed to be adjacent to the horizontal valley V1. The second insulating layer 250 positioned below the photosensitive organic material is exposed by forming the opening 301. Further, when the opening 301 is formed, a groove 303 is further formed at the sacrificial layer 300 by slit-exposing or halftone-exposing a periphery of the opening 301. In order to form the groove 303, the sacrificial layer 300 may be patterned by using a slit mask or a halftone mask. Since the groove 303 is formed by developing a part of the sacrificial layer 300, a portion of the sacrificial layer 300 where the groove 303 is formed is smaller than other portions in thickness. The groove 303 may be formed to surround the opening 301.

Figure 13:
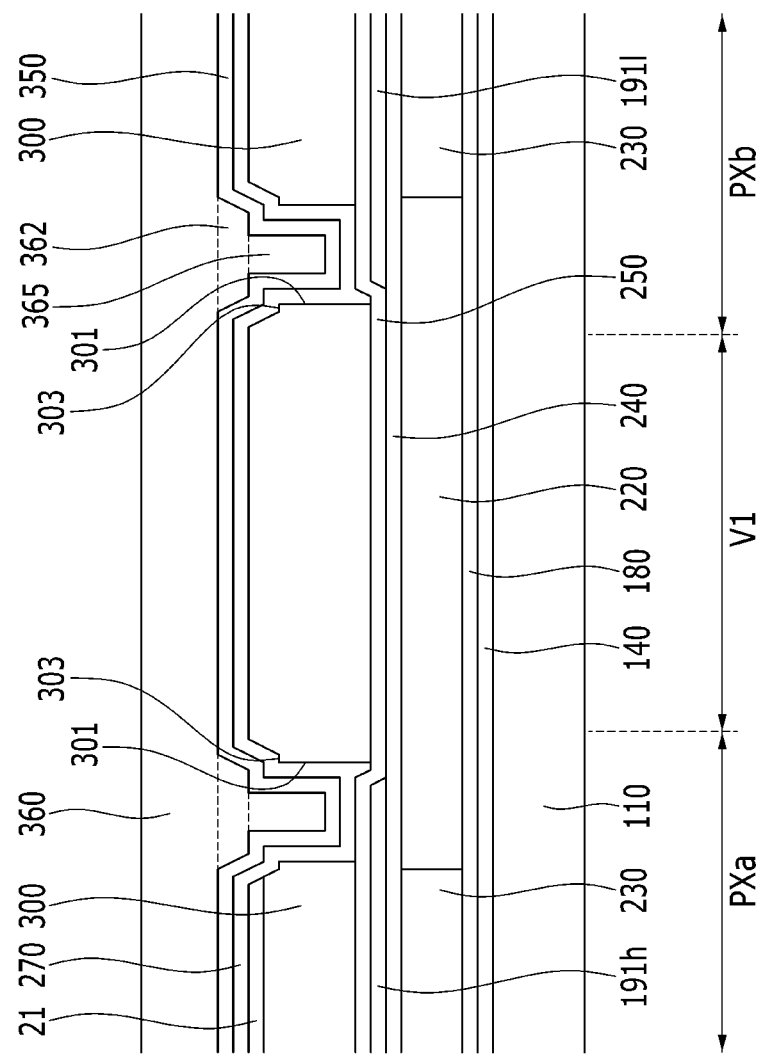
Figure 14:
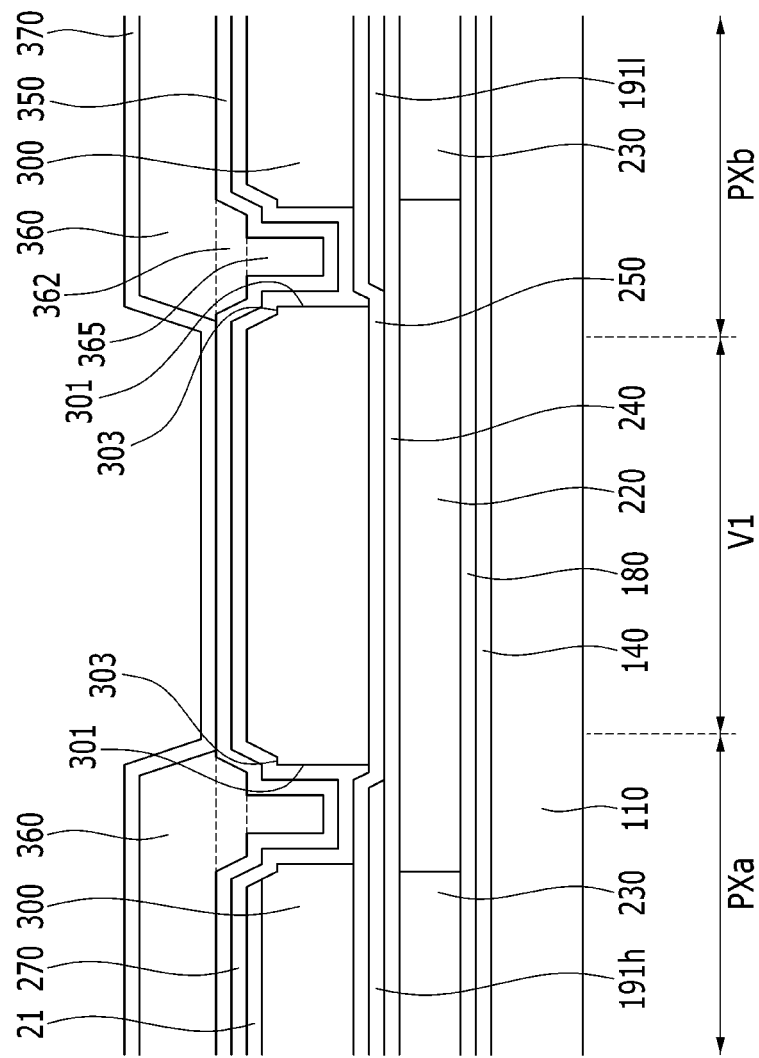

As illustrated in FIG. 13, a common electrode 270 is formed by depositing a transparent material such as, for example, indium tin oxide (ITO) and indium zinc oxide (IZO) on the sacrificial layer 300.

Next, a third insulating layer 350 may be formed on the common electrode 270 with an inorganic insulating material such as, for example, silicon oxide and silicon nitride.

Next, a roof layer 360 is formed on the third insulating layer 350 with an organic material, and a support 365 is formed in the opening 301. The roof layer 360 and the support 365 may be formed by using the same material during the same process.

A step 362 may be further formed in the groove 303 of the sacrificial layer 300 in a process of forming the roof layer 360 and the support 365. The roof layer 360, the support 365, and the step 362 may be simultaneously formed by coating an organic material on the entire surface of the substrate 110 after forming the third insulating layer 350. That is, the roof layer 360, the support 365, and the step 362 may be formed by using the same material during the same process.

The common electrode 270 and the third insulating layer 350 may be positioned below the roof layer 360 and the support 365. The support 365 may be formed to be overlapped with the pixel electrode 191. In this case, since the second insulating layer 250 is formed on the pixel electrode 191, the common electrode 270 positioned below the support 365 may be prevented from being short-circuited from the pixel electrode 191. The support 365 has a column shape, and the planar shape of the support 365 viewed from the upper surface of the substrate 110 may be various shapes such as, for example, a circle and a polygon.

The roof layer 360 positioned at the horizontal valley V1 may be removed by patterning the roof layer 360. As a result, the roof layers 360 are formed to be connected to each other along a plurality of pixel rows. Next, a fourth insulating layer 370 may be formed on the roof layer 360 with an inorganic insulating material such as, for example, silicon nitride (SiNx) and silicon oxide (SiOx). The fourth insulating layer 370 is formed on the patterned roof layer 360 to cover and protect the side of the roof layer 360. Next, the fourth insulating layer 370, the third insulating layer 350, and the common electrode 270 which are positioned at the horizontal valley V1 are removed by patterning the fourth insulating layer 370, the third insulating layer 350, and the common electrode 270. The sacrificial layer 300 positioned at the horizontal valley V1 is exposed outside by patterning the roof layer 360 and the common electrode 270.

Next, the sacrificial layer 300 is fully removed by supplying a developer onto the substrate 110 where the sacrificial layer 300 is exposed, or the sacrificial layer 300 is fully removed by an ashing process. When the sacrificial layer 300 is removed, the microcavity 305 is generated at a site where the sacrificial layer 300 is positioned.

The pixel electrode 191 and the common electrode 270 are spaced apart from each other with the microcavity 305 therebetween, and the pixel electrode 191 and the roof layer 360 are spaced apart from each other with the microcavity 305 therebetween. The common electrode 270 and the roof layer 360 are formed to cover the upper surface and both sides of the microcavity 305.

The microcavity 305 is exposed outside through a portion where the roof layer 360 and the common electrode 270 are removed, which is called an injection hole 307. The injection hole 307 is formed along the horizontal valley V1. For example, the injection holes 307 may be formed to face each other at the edges of the first subpixel area PXa and the second subpixel area PXb. The injection holes 307 may correspond to the lower side of the first subpixel area PXa and the upper side of the second subpixel area PXb to expose the side of the microcavity 305. Unlike this, the injection hole 307 may also be formed along the vertical valley V2.

Hereinafter, when a position relationship between the injection hole 307 and the support 365 is described, the support 365 is adjacent to the injection hole 307 to be formed in the microcavity 305. Two injection holes 307 may be formed in one microcavity 305, and the support 365 is adjacent to one injection hole 307 of the two injection holes 307.

When the position of the support 365 is described based on the horizontal valley V1, the support 365 is formed to be adjacent to both sides of the horizontal valley V1. The support 365 is formed to be adjacent to one horizontal valley V1 of the odd numbered horizontal valley V1 and the even numbered horizontal valley V1, but is not formed to be adjacent to the other horizontal valley V1. A plurality of supports 365 may be formed at one edge of one microcavity 305.

Next, the roof layer 360 is cured by applying heat to the substrate 110. This is to maintain the shape of the microcavity 305 by the roof layer 360.

When an aligning agent containing an alignment material is dropped on the substrate 110 by a spin coating method or an inkjet method, the aligning agent is injected into the microcavity 305 through the injection hole 307. The aligning agent is dropped in only the injection hole 307 which is not formed to be adjacent to the support 365, of the two injection holes 307 of the microcavity 305. When the aligning agent is injected into the microcavity 305 and then a curing process is performed, a solution component is evaporated and the alignment material remains on the inner wall of the microcavity 305. Accordingly, the first alignment layer 11 may be formed on the pixel electrode 191, and the second alignment layer 21 may be formed below the common electrode 270. The first alignment layer 11 and the second alignment layer 21 are formed to face each other with the microcavity 305 therebetween, and to be connected to each other at an edge of the pixel area PX.

The first and second alignment layers 11 and 21 may be aligned in a vertical direction to the substrate 110, except for the side of the microcavity 305. In addition, UV rays are irradiated to the first and second alignment layers 11 and 21, and as a result, the first and second alignment layers 11 and 21 may be aligned in a horizontal direction to the substrate 110.

In a drying process of the aligning agent, a solid is concentrated at a place and thus an agglomeration phenomenon of the alignment layer occurs. According to an embodiment, since the support 365 is formed to be adjacent to the injection hole 307 positioned at one edge of the microcavity 305, capillary forces in the two injection holes 307 formed in one microcavity 305 are different from each other. Since the capillary force in the injection hole 307 with the support 365 is relatively large, the agglomeration phenomenon of the alignment layer occurs around the injection hole 307 with the support 365. The injection hole 307 may be blocked by such an agglomeration phenomenon of the alignment layer, but the injection hole 307 is not fully blocked according to a kind of alignment material, a concentration of the aligning agent, or the like, and a gap (see FIG. 6) through which the air may be discharged may exist.

In the display device according to an embodiment, the agglomeration phenomenon of the alignment layer occurs only to be adjacent to any one injection hole 307 of the injection holes 307 positioned at both sides of the odd numbered horizontal valley V1 and the injection holes 307 positioned at both sides of the even numbered horizontal valley V1. For example, when the support 365 is formed to be adjacent to both sides of the odd numbered horizontal valley V1, the agglomeration phenomenon of the alignment layer occurs to be adjacent to both sides of the odd numbered horizontal valley V1. On the contrary, when the support 365 is formed to be adjacent to both sides of the even numbered horizontal valley V1, the agglomeration phenomenon of the alignment layer occurs to be adjacent to both sides of the even numbered horizontal valley V1.

Next, when the liquid crystal material constituted by liquid crystal molecules 310 is dropped on the substrate 110 by an inkjet method or a dispensing method, the liquid crystal material is injected into the microcavity 305 through the injection hole 307. In this case, a liquid crystal material is dropped only in any one injection hole 307 of the injection hole 307 formed along the odd numbered horizontal valley V1 and the injection hole 307 formed along the even numbered horizontal valley V1. For example, when the support 365 is formed to be adjacent to both sides of the odd numbered horizontal valley V1, the liquid crystal material is dropped in the even numbered horizontal valley V1, but is not dropped in the odd numbered horizontal valley V1. On the contrary, when the support 365 is formed to be adjacent to both sides of the even numbered horizontal valley V1, the liquid crystal material is dropped in the odd numbered horizontal valley V1, but is not dropped in the even numbered horizontal valley V1.

In the case where the support 365 is formed to be adjacent to both sides of the odd numbered horizontal valley V1, when the liquid crystal material is dropped in the injection hole 307 formed along the even numbered horizontal valley V1, the liquid crystal material is injected into the microcavity 305 through the injection hole 307 by capillary force. In this case, even though the injection hole 307 formed along the odd numbered horizontal valley V1 is blocked by the agglomeration phenomenon of the alignment layer, because there is a gap through which the air in the microcavity 305 may be discharged, the liquid crystal material flows into the microcavity 305, and the bubbles are not generated in the microcavity 305.

Even though the gap exists in the injection hole 307 adjacent to the support 365, the liquid crystal material is hardly injected due to the agglomeration phenomenon of the alignment layer. According to an embodiment, when the support 365 is formed at the odd numbered horizontal valley V1, the liquid crystal material is dropped only in the even numbered horizontal valley V1. However, when the formation position of the support 365 is the same for each microcavity 305, the liquid crystal material needs to be dropped in horizontal valleys V1. For example, when the support 365 is formed at the upper edge of each microcavity 305, the liquid crystal material needs to be injected through the injection hole 307 positioned at the lower edge of the microcavity 305. Accordingly, the liquid crystal material needs to be dropped in both the even numbered horizontal valley V1 and the odd numbered horizontal valley V1.

In a process of manufacturing the display device, since the liquid crystal material is dropped in only one horizontal valley V1 of the odd numbered horizontal valley V1 and the even numbered horizontal valley V1, the processing time may be shortened in comparison with a case where the liquid crystal material needs to be dropped in all the horizontal valleys V1. Further, the costs may be reduced due to reduction of the processing time.

Next, an overcoat 390 is formed by depositing a material which does not react with the liquid crystal molecules 310 on the fourth insulating layer 370. The overcoat 390 is formed to cover the injection hole 307 where the microcavity 305 is exposed outside to seal the microcavity 305.

Next, although not illustrated, polarizers may be further attached onto the upper and lower surfaces of the display device. The polarizers may include a first polarizer and a second polarizer. The first polarizer may be attached onto the lower surface of the substrate 110, and the second polarizer may be attached onto the overcoat 390.

While this invention has been described in connection with certain embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| 11, 21: Alignment layer | 110: Substrate |
| 121: Gate line | 123: Step-down gate line |
| 124h, 124l, 124c: Gate electrode | 131: Storage electrode line |
| 140: Gate insulation layer | 154h, 154l, 154c: Semiconductor |
| 171: Data line | 173h, 173l, 173c: Source electrode |
| 175h, 175l, 175c: Drain electrode | 191: Pixel electrode |
| 191h, 191l: Subpixel electrode | 220: Light block |
| 230: Color filter | 240, 250, 350, 370: Insulating layer |
| 270: Common electrode | 300: Sacrificial layer |
| 301: Opening | 303: Groove |
| 305: Microcavity | 307: Injection hole |
| 308: Gap | 310: Liquid crystal molecule |
| 360: Roof layer | 362: Step |
| 365: Support | 390: Overcoat |
| V1: Horizontal valley | V2: Vertical valley |

What is claimed is:

1. A display device, comprising:
   a substrate including a plurality of pixel areas disposed in a matrix configuration;
   a pixel electrode positioned in each of the pixel areas;
   a roof layer positioned on the pixel electrode and spaced apart from the pixel electrode with a microcavity therebetween;
   injection holes respectively positioned at two edges of the microcavity;
   a support positioned at one edge of the microcavity and adjacent to one of the injection holes;
   an alignment layer positioned on an inner surface of the microcavity; and
   a liquid crystal layer positioned in the microcavity,
   wherein the support is disposed at each of the opposite edges of two microcavities which are adjacent to each other in a column direction.

2. The display device of claim 1, wherein the alignment layer is agglomerated around the support, and the injection hole adjacent to the support is not fully blocked.

3. The display device of claim 2, wherein a plurality of the microcavities is disposed in a matrix configuration, and a first valley is formed between microcavities positioned in different rows.

4. The display device of claim 3, wherein the support is positioned to be adjacent to both sides of the first valley.

5. The display device of claim 4, wherein the support is positioned to be adjacent to any one first valley of an odd numbered first valley and an even numbered first valley, but is not positioned to be adjacent to the other first valley of the odd and even numbered first valleys.

6. The display device of claim 2, wherein the support has a column shape.

7. The display device of claim 6, wherein one or more supports are positioned at one edge of each microcavity.

8. The display device of claim 1, further comprising a common electrode positioned on an upper inner surface of the microcavity; and an alignment layer positioned between the common electrode and the liquid crystal layer.

9. The display device of claim 1, further comprising an insulating layer positioned between the support and the pixel electrode, wherein the support overlaps the pixel electrode.

10. The display device of claim 1, wherein the support does not overlap the pixel electrode.

11. A manufacturing method of a display device, comprising:
preparing a substrate on which a plurality of pixel areas is to be disposed in a matrix configuration;
forming a pixel electrode in each pixel area;
forming a sacrificial layer on the pixel electrode;
forming an opening in the sacrificial layer by removing at least a part of the sacrificial layer;
forming a roof layer on the sacrificial layer and forming a support in the opening;
forming injection holes by patterning the roof layer so that at least a part of the sacrificial layer is exposed;
forming a microcavity between the pixel electrode and the roof layer by removing the sacrificial layer;
forming an alignment layer on an inner surface of the microcavity by injecting an aligning agent through one injection hole; and
forming a liquid crystal layer in the microcavity by injecting a liquid crystal material through the one injection hole,
wherein the support is formed at each of the opposite edges of two microcavities which are adjacent to each other in a column direction.

12. The manufacturing method of claim 11, wherein the injection holes are respectively formed at both edges of the microcavity, the support is formed at one edge of the microcavity to be adjacent to the other injection hole, and the alignment layer is agglomerated around the support so that the other injection hole adjacent to the support is not fully blocked due to the agglomeration phenomenon of the alignment layer.

13. The manufacturing method of claim 12, wherein the microcavities are disposed in a matrix direction, and a first valley is formed between the microcavities positioned in different rows.

14. The manufacturing method of claim 13, wherein the support is formed to be adjacent to any one first valley of an odd numbered first valley and an even numbered first valley, but is not formed to be adjacent to the other first valley of the odd and even numbered first valleys.

15. The manufacturing method of claim 12, wherein the aligning agent is injected through the injection hole which is not adjacent to the support.

16. The manufacturing method of claim 12, wherein the liquid crystal material is injected through the injection hole which is not adjacent to the support.

17. The manufacturing method of claim 12, wherein the support has a column shape.

18. The manufacturing method of claim 17, wherein one or more supports are formed at one edge of each microcavity.

19. The manufacturing method of claim 11, further comprising forming an overcoat on the roof layer to seal the microcavity.

20. The manufacturing method of claim 11, wherein the support does not overlap the pixel electrode.

\* \* \* \* \*